United States Patent

[11] 3,627,124

[72] Inventors Peter R. Hance
Allentown;
Ronald I. Strohl, Walnutport; William R. Wanesky, Wescosville, all of Pa.

[21] Appl. No. 6,678
[22] Filed Jan. 29, 1970
[45] Patented Dec. 14, 1971
[73] Assignee Western Electric Company, Incorporated
New York, N.Y.

[54] METHOD FOR SEPARATING SELECTED ARTICLES FROM AN ARRAY
7 Claims, 6 Drawing Figs.

[52] U.S. Cl. .......... 209/45, 324/158
[51] Int. Cl. .......... B07b 13/00
[50] Field of Search .......... 209/1–4, 9, 45–47, 49; 156/230, 234, 239, 344; 324/158 T

[56] References Cited

UNITED STATES PATENTS

| | | | |
|---|---|---|---|
| 2,291,447 | 7/1942 | Bierbrauer .......... | 209/49 |
| 2,468,472 | 4/1949 | Townsend .......... | 209/49 X |
| 2,907,456 | 10/1959 | Brison .......... | 209/46 X |
| 3,006,465 | 10/1961 | James .......... | 209/45 |
| 3,344,351 | 9/1967 | Simonyan et al. .......... | 324/158 T |

*Primary Examiner*—Frank W. Lutter
*Assistant Examiner*—Ralph J. Hill
*Attorneys*—W. M. Kain, R. P. Miller and R. Y. Peters

ABSTRACT: A method for separating defective beam-lead semiconductor devices from an array of devices cemented by wax to a substrate. The devices are tested, the defective ones marked with epoxy ink, the array covered with a screen, the ink cured to fasten the defective devices to the screen, the wax melted and the screen removed to simultaneously separate all the defective devices from the array.

2 Sheets-Sheet 1

INVENTORS:
P. R. HANCE
R. I. STROHL
W. R. WANESKY
By: R.Y. Peters
ATTORNEY

METHOD FOR SEPARATING SELECTED ARTICLES FROM AN ARRAY

BACKGROUND OF THE INVENTION

This invention relates to a method for separating selected articles from an array of such articles and more particularly to a method of separating defective beam-lead semiconductor devices from an array of such devices which have been fastened to a substrate with wax.

This invention is particularly adapted to the manufacture of beam-lead semiconductor devices where the leads are exposed as a result of etching a semiconductor slice into separate devices. Examples of beam-lead semiconductor devices are disclosed in M. P. Lepselter U.S. Pat. Nos. 3,287,612 and 3,335,338. Beam-lead technology, applied to transistor and integrated circuit devices, is disclosed in M. P. Lepselter, "Beam-Lead Technology," the Bell System Technical Journal, American Telephone and Telegraph Company, Vol. 45, pp. 233–253, Feb., 1966.

The typical beam-lead integrated circuit device may be very small, having a body about 18 mils square and 2 mils thick with a multiplicity of beam leads, the number depending on the circuit involved. These leads are usually about 0.4 of a mil. thick, 3 mils wide and 9 mils long.

The devices are manufactured in batches on a slice of semiconductor material, such as silicon, which is cemented by wax to a supporting substrate. The slice may contain 100 or more devices with their leads extending from the body of the device to form cantilever beams. The beam leads perform a function analogous to the pigtail leads of an ordinary resistor or capacitor, i.e., the beam leads provide a means for both electrically and mechanically joining the integrated circuit devices to external circuits. The devices are produced on the slice in an ordered array with the same leads of each device oriented in the same direction for convenience and economy in manufacturing. The separation of the slice into an array of discrete devices fastened to a substrate by wax is performed by photoresist masking and etching techniques well known in the art.

The devices still fastened to the substrate by wax are tested and the ones that fail to meet specifications, i.e., the defective ones, are marked with carbon ink. The wax is then melted and the good devices which meet specifications removed individually for use.

A microscope must be used to view the array and find the unmarked devices because of their small size, only 18 mils square. Since a microscope has a limited field of vision, the array must be traversed with the microscope to permit finding and individually removing the good devices. This is known as sorting and is very tedious and time consuming. It is extremely advantageous to reduce the manufacturing time consumed by this sorting operation, the preferred solution being to eliminate the operation altogether.

SUMMARY OF THE INVENTION

An object of the invention resides in new and improved methods of simultaneously separating a plurality of selected devices from an array.

The objectives are achieved in accordance with the invention by testing the array of devices, while waxed to a substrate, and marking the defective devices with epoxy ink. While the epoxy ink is still fluid, a polyester mesh screen is placed over and firmly pressed against the array of devices so that the ink on the defective devices penetrates and engages the screen. The epoxy ink is then cured to secure the defective devices to the screen. Following this the wax is melted or dissolved and the screen removed. Since the defective devices are secured to the screen, they are all removed and separated from the array simultaneously with the screen and, therefore, sorting the good from the bad devices is eliminated.

BRIEF DESCRIPTION OF THE DRAWINGS

Other objects, advantages and features of the invention will be apparent from the following detailed description of specific examples and embodiments thereof, in which.

DETAILED DESCRIPTION

The invention will be described in connection with beam-lead integrated circuits; however, it is to be understood that the invention is applicable to other articles which are to be selected and separated from an array of such articles.

Figures 1, 2:
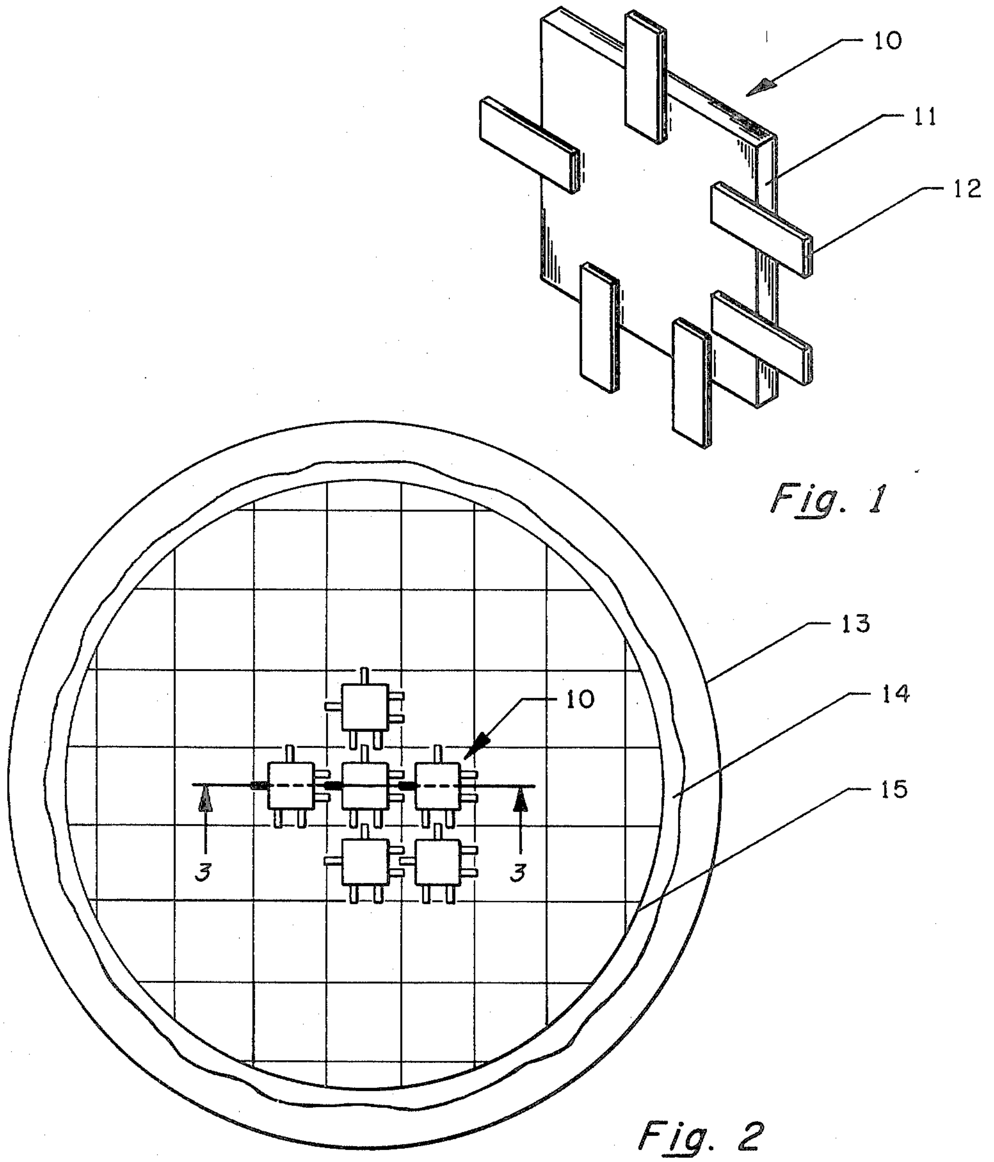
FIG. 1 is an isometric view of an integrated circuit device.
FIG. 2 is a plan view of a semiconductor slice cemented to a substrate with wax and divided into enlarged individual devices.

Referring now to FIG. 1, there is shown an integrated circuit or device 10 having a semiconductor body or wafer 11 and beam leads 12. The active portion of the device 10 is formed in the wafer 11 and beam leads 12 connect to the active portions. The devices 10 with the beam leads 12 are small and, therefore, 100 or more of the devices are made from a single slice 15 (refer to FIG. 2) of semiconductor material such as silicon. The devices 10 are all oriented in the same direction to aid in subsequent manufacturing steps.

After the devices have been formed in the slice 15 of silicon, the slice is cemented to a glass or ceramic substrate 13, usually with wax 14, lead side down. Advantageously, the wax 14 is made by the Biwax Corporation under the trade designation B–7050 and must be filtered to remove all particles over 0.2 mil. in diameter.

The slice 15 is separated into discrete devices 10 by removing the excess silicon from between the devices. The removal of the silicon is accomplished by the use of photoresist masking and etching techniques well known in the art. A few of the integrated circuits or devices 10 are shown greatly enlarged after separation in FIG. 2.

Figure 3:
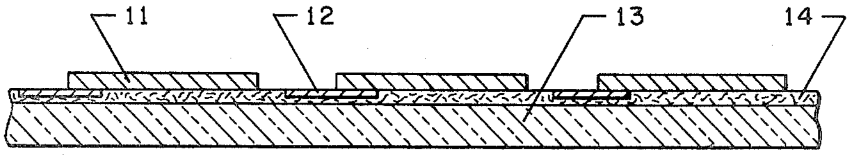
FIG. 3 is an enlarged partial cross section along line 3—3 of a portion of FIG. 2.

Referring now to FIG. 3, which is an enlarged portion of FIG. 2, the beam leads 12 are shown exposed by the silicon removal and partially embedded in the wax 14. This exposure permits the contacting of the beam leads 12 by electrical probes to test the integrated circuits formed in the wafers 11.

Figure 4:
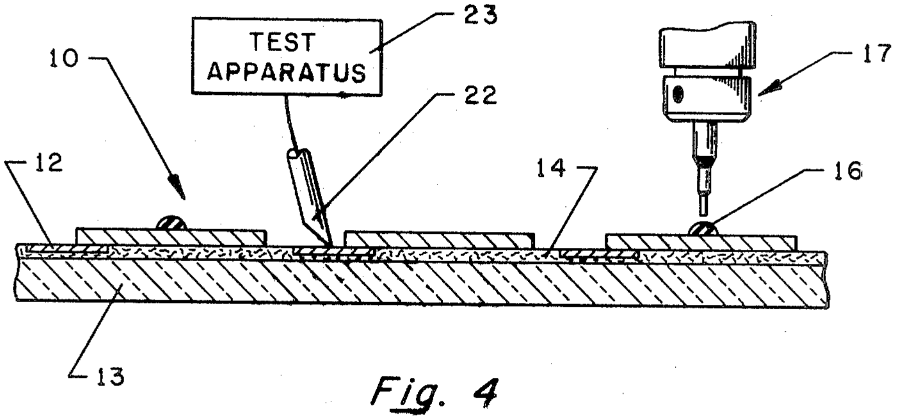
FIG. 4 is an enlarged partial cross section showing defective devices identified with epoxy ink.

Referring now to FIG. 4, the devices 10 are tested by contacting the appropriate beam leads 12 with the probes 22 (only one shown for illustration) of a suitable test apparatus 23. The defective devices 10 are marked with a dot of hardenable material, such as epoxy ink 16, by means of a marker 17. One such material is an ink made by the Markem Corporation and sold as a specialty ink under the trade designation H 6896/0. Advantageously, the ink is thinned with trichlorethylene in a ratio of 1:1 before use and remains fluid at room temperature at least long enough to mark all the defective devices on the substrate 13.

The marker 17 may be a "B" inking tip or point of a lettering pen such as is sold under the registered trademark Leroy.

Figure 5:
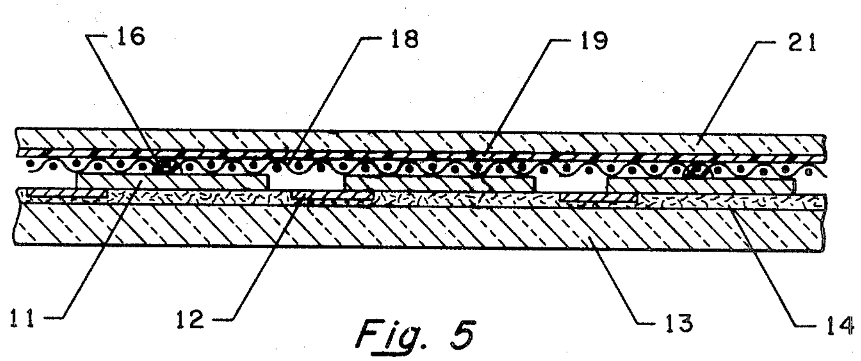
FIG. 5 is an enlarged partial cross section showing the polyester mesh screen being pressed into engagement with the epoxy ink.

Referring now to FIG. 5, when all defective devices 10 in the array have been marked, a polyester screen 18 is placed over the array and pressed into firm contact with the wafers 11 and the epoxy ink 16. The screen 18 is typically made of 0.0022 inches diameter polyester monofilament woven to a 200 mesh. Preferably, the screen 18 is pressed into contact with the devices 10 by means of a glass plate 21 having a polytetrafluoroethylene coating 19. When the screen 18 is pressed against the wafers 11 of the defective devices 10 having the epoxy ink 16 thereon, the ink 16 penetrates and engages the screen 18. The coating 19 on the plate 21 minimizes the sticking of the ink 16 to the plate 21. After the epoxy ink 16 has engaged the screen 18, the ink is cured at a suitable temperature, thus, securing the defective devices 10 to the screen 18.

Figure 6:
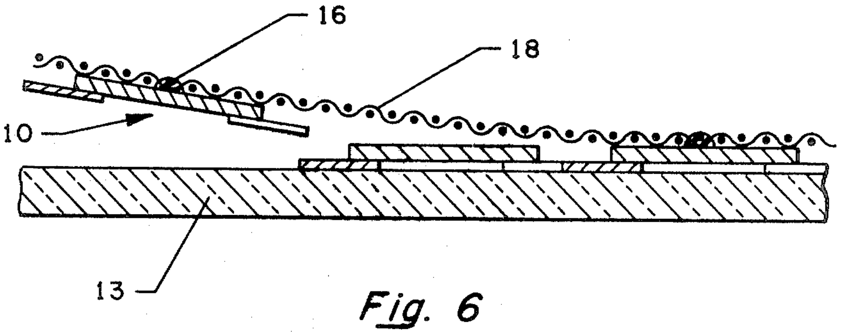
FIG. 6 is an enlarged partial cross section showing the devices being removed by the polyester mesh screen.

After curing the ink 16, refer to FIG. 6, the wax 14 is melted, or dissolved in a suitable solvent, and the screen 18 removed. Since melting or dissolving the wax 14 does not remove or soften the cured epoxy ink 16, the selected, i.e., defective devices 10 still adhere to the screen 18 and are automatically removed with the screen. This leaves the nonselected, i.e., nondefective or good, devices 10 in exactly the same original oriented position in the array of devices on the substrate 13.

What is claimed is:

1. A method for separating selected articles from an array, which comprises the steps of:

marking selected articles in the array with an adhesive;

applying a sheet of material to the array, the material being one to which the adhesive on the selected articles will adhere; and removing the sheet of material to remove and separate the selected articles from the nonselected articles whereby the nonselected articles remain in the array.

2. A method of separating articles from an array, which comprises the steps of:

selecting the articles to be separated from the array by means of an identifiable characteristic;

marking the article so selected with an adhesive;

applying a sheet of material, to which the adhesive will adhere, to the entire array; and removing the sheet of material to remove the selected articles whereby all of the selected articles are separated from the nonselected articles simultaneously.

3. A method, as recited in claim 2, wherein the adhesive is epoxy ink and the sheet material is polyester mesh.

4. A method of separating articles from an array, which comprises the steps of:

testing the articles to select those to be separated from the array;

marking the selected articles with epoxy ink;

placing a polyester mesh screen over the array;

pressing the screen against the array and epoxy ink to engage the ink with the screen;

curing the epoxy ink to secure the selected articles to the screen; and removing the screen to remove the selected articles, the selected articles being separated simultaneously from the nonselected articles and the nonselected articles remaining in the array.

5. A method, as recited in claim 4, wherein the articles are semiconductor devices.

6. A method of separating semiconductor devices from an oriented array of such devices cemented with wax to a substrate, which comprises the steps of:

testing the individual devices in the array to determine the defective and nondefective devices;

marking the defective devices with an epoxy ink, the ink being hardenable upon curing;

applying a polyester mesh screen to the array of devices;

pressing the screen against the array of devices by means of a polytetrafluoroethylene-coated plate to force the screen into engagement with the epoxy ink;

curing the epoxy ink to harden the ink and secure the defective parts to the screen;

dissolving the wax to free the devices; and removing the screen to remove the defective devices whereby the nondefective devices are left oriented on the substrate.

7. A method of separating defective beam-lead integrated circuit devices from an oriented array of devices secured with wax to a substrate, which comprises the steps of:

testing the individual devices in the array to determine the defective and good devices;

applying a liquid epoxy cement to the top surfaces of the defective devices, the cement being hardenable;

applying a polyester mesh screen over the array of devices while the cement is fluid;

pressing the screen against the devices with a polytetrafluoroethylene-coated plate to force the polyester mesh into engagement with the cement;

curing the epoxy cement to secure the defective devices to the polyester mesh;

melting the wax; and removing the polyester mesh, while the wax is still molten, thereby removing the defective devices and leaving the good devices still oriented on the substrate.

* * * * *